US010995623B2

(12) United States Patent
Sippel et al.

(10) Patent No.: US 10,995,623 B2
(45) Date of Patent: May 4, 2021

(54) CERAMIC MATRIX COMPOSITE TURBINE BLADE WITH ABRASIVE TIP

(71) Applicants: Rolls-Royce Corporation, Indianapolis, IN (US); Rolls-Royce High Temperature Composites Inc., Cypress, CA (US); Rolls-Royce North American Technologies Inc., Indianapolis, IN (US)

(72) Inventors: Aaron D. Sippel, Zionsville, IN (US); Andrew Glucklich, Brownsburg, IN (US); Sungbo Shim, Irvine, CA (US); Ted J. Freeman, Danville, IN (US)

(73) Assignees: Rolls-Royce Corporation, Indianapolis, IN (US); Rolls-Royce High Temperature Composites Inc., Cypress, CA (US); Rolls-Royce North American Technologies Inc., Indianapolis, IN (US)

(*) Notice: Subject to any disclaimer, the term of this patent is extended or adjusted under 35 U.S.C. 154(b) by 322 days.

(21) Appl. No.: 15/959,994

(22) Filed: Apr. 23, 2018

(65) Prior Publication Data

US 2019/0323363 A1 Oct. 24, 2019

(51) Int. Cl.
*F01D 5/20* (2006.01)
*F01D 11/08* (2006.01)
*F01D 5/28* (2006.01)

(52) U.S. Cl.
CPC ............. *F01D 5/20* (2013.01); *F01D 5/282* (2013.01); *F01D 5/284* (2013.01); *F01D 11/08* (2013.01); *F05D 2220/32* (2013.01); *F05D 2230/50* (2013.01); *F05D 2240/307* (2013.01); *F05D 2240/55* (2013.01); *F05D 2300/224* (2013.01); *F05D 2300/2261* (2013.01); *F05D 2300/2283* (2013.01); *F05D 2300/609* (2013.01); *F05D 2300/6033* (2013.01)

(58) Field of Classification Search
CPC . F01D 11/08; F01D 5/20; F01D 5/225; F01D 5/282; F01D 5/284; F01D 11/12; F01D 5/288; F05D 2220/32; F05D 2230/50; F05D 2240/307; F05D 2240/55; F05D 2300/224; F05D 2300/2261; F05D 2300/2283; F05D 2300/6033; F05D 2300/609

See application file for complete search history.

(56) References Cited

U.S. PATENT DOCUMENTS

| | | | |
|---|---|---|---|
| 5,359,770 A | 11/1994 | Brown et al. |
| 5,551,840 A | 9/1996 | Benoit et al. |
| 5,932,356 A | 8/1999 | Sileo et al. |
| 6,190,124 B1 | 2/2001 | Freling et al. |
| 6,234,747 B1 | 5/2001 | Mielke et al. |
| 6,533,285 B2 | 3/2003 | Nava et al. |
| 6,832,890 B2 | 12/2004 | Booth |
| 6,887,036 B2 | 5/2005 | Ohara et al. |
| 6,887,528 B2 | 5/2005 | Lau et al. |

(Continued)

*Primary Examiner* — Kenneth Bomberg
*Assistant Examiner* — Julian B Getachew
(74) *Attorney, Agent, or Firm* — Barnes & Thornburg LLP

(57) ABSTRACT

The present disclosure relates generally to blades used in gas turbine engines. More specifically designs in accordance with the present disclosure include turbine blades comprising ceramic matrix composite materials with abrasive tips coupled thereto.

6 Claims, 5 Drawing Sheets

(56) References Cited

U.S. PATENT DOCUMENTS

| | | | |
|---|---|---|---|
| 6,896,485 B2 | 5/2005 | Ohara et al. | |
| 7,473,072 B2 | 1/2009 | Malak et al. | |
| 7,510,777 B2 | 3/2009 | Darolia et al. | |
| 7,922,455 B2 * | 4/2011 | Itzel | F01D 5/288 416/228 |
| 8,172,519 B2 | 5/2012 | Jarrabet et al. | |
| 8,186,946 B2 | 5/2012 | Parkos, Jr. et al. | |
| 8,616,847 B2 | 12/2013 | Allen | |
| 8,807,955 B2 | 8/2014 | Wrabel et al. | |
| 9,163,519 B2 * | 10/2015 | Kleinow | F01D 5/225 |
| 9,581,041 B2 | 2/2017 | Sinatra et al. | |
| 9,598,973 B2 | 3/2017 | Ghasripoor et al. | |
| 2001/0004436 A1 | 6/2001 | Chasripoor et al. | |
| 2001/0052375 A1 | 12/2001 | Sievers et al. | |
| 2004/0047726 A1 | 3/2004 | Morrison | |
| 2004/0213919 A1 | 10/2004 | Fried | |
| 2005/0129511 A1 | 6/2005 | Allen | |
| 2006/0019087 A1 | 1/2006 | Mazzola et al. | |
| 2006/0171813 A1 | 8/2006 | Malak et al. | |
| 2006/0285972 A1 | 12/2006 | Nicoll et al. | |
| 2007/0237667 A1 | 10/2007 | Merrill et al. | |
| 2009/0202355 A1 | 8/2009 | Dierksmeier et al. | |
| 2011/0182720 A1 | 7/2011 | Kojima et al. | |
| 2012/0195766 A1 | 8/2012 | Cohin et al. | |
| 2013/0017072 A1 | 1/2013 | Ali et al. | |
| 2013/0045091 A1 | 2/2013 | Della-Fera et al. | |
| 2015/0078900 A1 | 3/2015 | Allen | |
| 2015/0192029 A1 | 7/2015 | Roberts, III et al. | |
| 2015/0267544 A1 | 9/2015 | Gurt Santanach et al. | |
| 2015/0308276 A1 | 10/2015 | Kleinow et al. | |
| 2015/0354373 A1 | 12/2015 | Guo et al. | |
| 2015/0377039 A1 | 12/2015 | Shuck | |
| 2016/0069195 A1 | 3/2016 | Hewitt et al. | |
| 2016/0186595 A1 | 3/2016 | Asada et al. | |
| 2016/0177745 A1 | 6/2016 | Uskert et al. | |
| 2016/0214907 A1 | 7/2016 | Shim et al. | |
| 2016/0236995 A1 | 8/2016 | Lai et al. | |
| 2016/0237831 A1 | 8/2016 | Strock | |
| 2016/0305442 A1 | 10/2016 | Strock | |
| 2016/0333698 A1 | 11/2016 | Weaver et al. | |
| 2016/0341051 A1 | 11/2016 | Hewitt et al. | |
| 2017/0089214 A1 | 11/2017 | Giovannetti et al. | |
| 2017/0314571 A1 | 11/2017 | Salter et al. | |
| 2017/0362952 A1 | 12/2017 | Stoyanov et al. | |

* cited by examiner

CERAMIC MATRIX COMPOSITE TURBINE BLADE WITH ABRASIVE TIP

FIELD OF THE DISCLOSURE

The present disclosure relates generally to blades used in gas turbine engines; and more specifically to turbine blades comprising ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Airfoils are included in the rotating blades of the turbine to capture energy from the products of the combustor. The interaction of combustion products with the airfoils heats the airfoils. Airfoils are often made from high-temperature compatible materials and/or are actively cooled by supplying relatively cool air to the airfoils. To this end, some airfoils incorporate ceramic matrix composite materials or ceramic matrix composite material heat shields to withstand very high temperatures. Design and manufacture of airfoils from these ceramic matrix composite materials presents challenges because of the limitations associated with use of these materials within the primary gas path in a turbine engine.

SUMMARY

The present disclosure may comprise one or more of the following features and combinations thereof.

According to one aspect of the present disclosure, a turbine blade adapted for rotation about a central axis in a gas turbine engine is taught. The turbine blade may include a primary body and an abrasive tip. The primary body may comprise ceramic matrix composite materials formed to include an airfoil shaped to interact with hot gasses in a gas turbine engine and to extract work therefrom. The abrasive tip may be bonded to a radially-outwardly facing surface of the airfoil included in the primary body. In illustrative embodiments, the abrasive tip may be sized to cover at least a portion of the radially-outwardly facing surface of the airfoil to protect ceramic matrix composite materials of the airfoil from rub by structures mounted radially-outward of the turbine blade when the turbine blade is rotated during use in the gas turbine engine.

In illustrative embodiments, the abrasive tip may be made from ceramic containing materials. The abrasive tip may comprise chopped ceramic fibers suspended in a ceramic matrix material discontinuous from ceramic fabric suspended in ceramic matrix material that makes up the primary body. The abrasive tip may include particles of silicon-carbide, carbon-boron, and/or silicon-nitride. The particles may have a diameter of between 10-300 micrometers, though other sides are contemplated. In some embodiments, a ceramic matrix material couples the abrasive tip to the primary body.

In illustrative embodiments, the abrasive tip comprises a number of laminate layers of ceramic reinforcement fibers. The laminate layers may be suspended in a ceramic matrix material.

In illustrative embodiments, the abrasive tip may be a monolithic ceramic piece. In some such embodiments, a ceramic matrix material couples the abrasive tip to the primary body.

According to a second aspect of the present disclosure, a shrouded turbine blade adapted for rotation about a central axis in a gas turbine engine is taught. This turbine blade may include a primary body and an abrasive tip. The primary body may comprise ceramic matrix composite materials formed to include an airfoil and a blade shroud. The airfoil may be shaped to interact with hot gasses in a gas turbine engine and to extract work therefrom. The blade shroud may extend from the airfoil away from the central axis and circumferentially in both directions to define an outer boundary of a primary gas path across the airfoil. The an abrasive tip may be bonded to a radially-outwardly facing surface of the blade shroud included in the primary body. In illustrative embodiments, the abrasive tip may be configured to protect ceramic matrix composite materials of the blade shroud from rub by structures mounted radially-outward of the turbine blade when the turbine blade is rotated during use in the gas turbine engine.

In illustrative embodiments, the abrasive tip may comprise chopped ceramic fibers suspended in a ceramic matrix material. The abrasive tip may include particles of silicon-carbide, carbon-boron, and/or silicon-nitride. The particles may have a diameter of between 10-300 micrometers, though other sides are contemplated.

In illustrative embodiments, the blade shroud may include a shroud panel that provides the outer boundary of the primary gas path across the airfoil and at least one knife seal that extends radially outward from the shroud panel. The abrasive tip may be bonded to a radially-outwardly facing surface of the at least one knife seal.

The abrasive tip may include a forward portion bonded to a circumferentially-facing leading edge surface of the blade shroud to protect ceramic matrix composite materials of the blade shroud. The blade shroud may include a leading edge recess spaced apart from the outer boundary of the primary gas path across the airfoil that receives the forward portion of the abrasive tip.

In illustrative embodiments, the abrasive tip may include a retention portion that extends radially inward into the blade shroud to establish a plurality of radially-extending interfaces between the abrasive tip and the blade shroud.

According to yet another aspect of the present disclosure, a method of making a turbine blade adapted for rotation about a central axis in a gas turbine engine is taught. The method may include laying up a plurality of ceramic fabric into a laid up primary body formed to include an airfoil. The airfoil may be shaped to interact with hot gasses in a gas turbine engine and to extract work therefrom. The method may include partially densifying the laid up primary body with ceramic matrix material to form a green primary body.

The method may further include arranging an abrasive tip preform on a radially-outwardly facing surface of the green primary body. The method may then include slurry or melt infiltrating the combination of the green primary body and the preform abrasive tip with ceramic matrix material to create a ceramic matrix material between a then-established primary body and abrasive tip thereby coupling the abrasive tip to the primary body.

In illustrative embodiments of the method, the abrasive tip may comprise chopped ceramic fibers suspended in a ceramic matrix material. The abrasive tip may include particles of silicon-carbide, carbon-boron, and/or silicon-nitride. The particles may have a diameter of between about 10-300 micrometers, though other sides are contemplated.

In illustrative embodiments of the method, the primary body may be formed to include a blade shroud that extends from the airfoil away from the central axis and circumferentially in both directions to define an outer boundary of a primary gas path across the airfoil. The abrasive tip may be bonded to a radially-outwardly facing surface of the blade shroud included in the primary body.

In illustrative embodiments of the method, the blade shroud may include a leading edge recess spaced apart from the outer boundary of the primary gas path across the airfoil that receives the forward portion of the abrasive tip. This may establish a radially-extending interface between the abrasive tip and the blade shroud.

These and other features of the present disclosure will become more apparent from the following description of the illustrative embodiments.

DETAILED DESCRIPTION OF THE DRAWINGS

Figure 1:
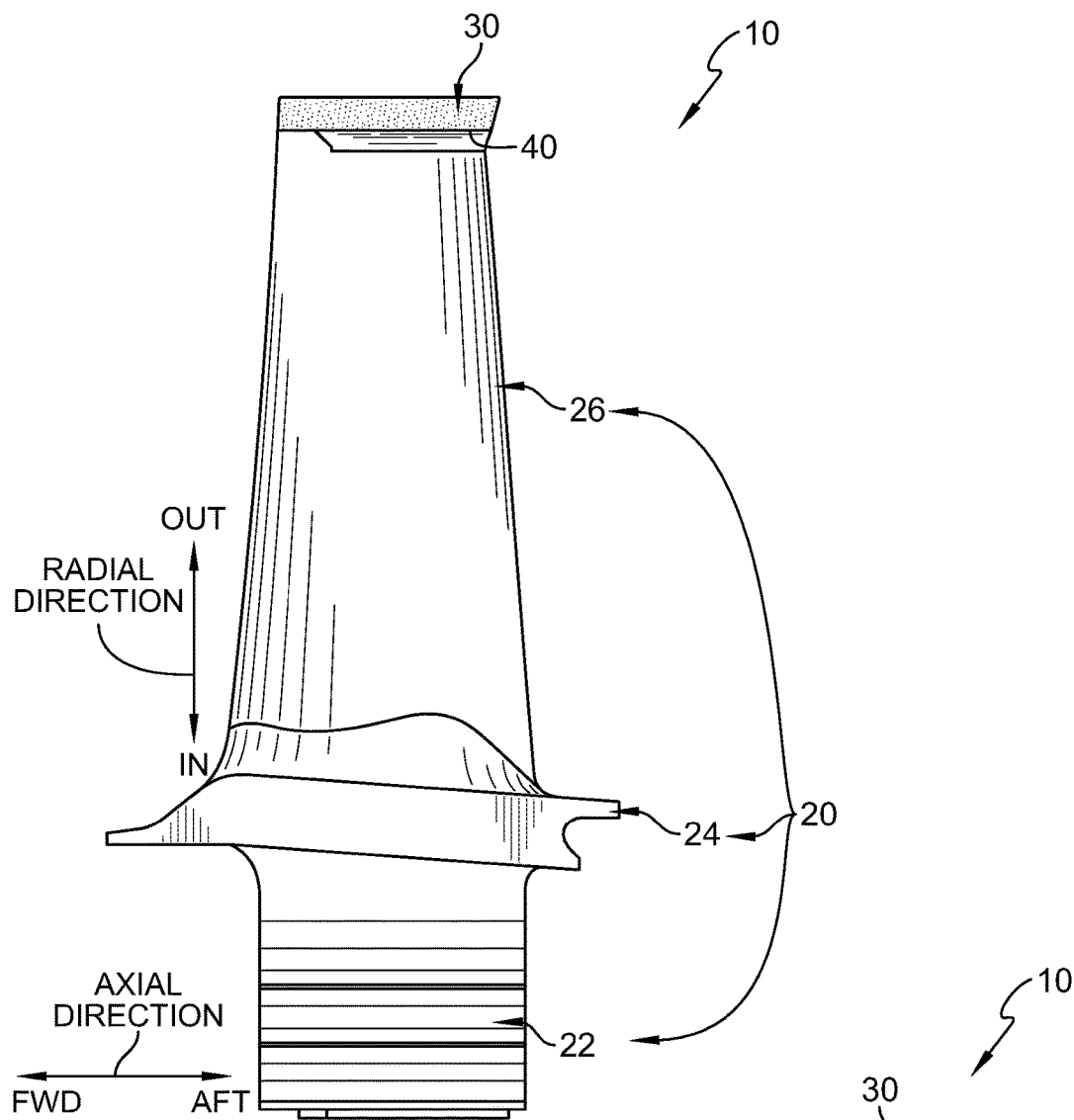
FIG. 1 is a side elevation view of a turbine blade including, from bottom to top, a root, a platform, an airfoil, and an abrasive tip configured to protect ceramic matrix composite materials included in the airfoil from rub damage that could be incurred during use in a gas turbine engine.

For the purposes of promoting an understanding of the principles of the disclosure, reference will now be made to a number of illustrative embodiments illustrated in the drawings and specific language will be used to describe the same.

Figure 2:
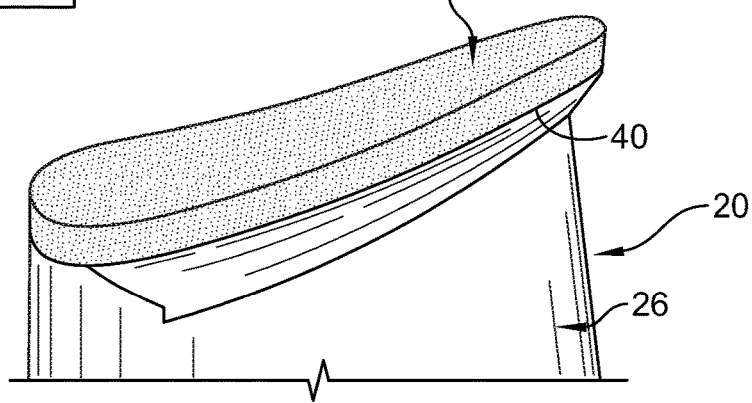
FIG. 2 is a perspective view of a radially-outer end of the airfoil and the abrasive tip included in the turbine blade of FIG. 1 showing that the illustrative abrasive tip covers substantially all of the radially-outwardly facing surface area of the airfoil.

A turbine blade 10 according to the present disclosure includes a primary body 20 and an abrasive tip 30 as shown, for example, in FIGS. 1 and 2. The primary body 20 and the abrasive tip 30 of the turbine blade 10 comprise ceramic matrix composite materials that are suitable for use in high temperature environments, like the primary gas path GP of a gas turbine engine. However, exposure of the constituent parts of the ceramic matrix composite materials in the primary body 20 to the primary gas path GP via rubbing with other engine parts can lead to degradation of the materials. Accordingly, the abrasive tip 30 is arranged to interface parts radially-outward of the primary body 20 that are likely to rub the turbine blade 10 during use.

The turbine blade 10 of the present disclosure is adapted for rotation about a central axis of a gas turbine engine so as to drive rotation of other components within the engine. The turbine blade 10 includes the primary body 20 and the abrasive tip 30 as shown in FIGS. 1 and 2. The primary body 20 is shaped to provide a root 22, a platform 24, and an airfoil 26. The abrasive tip 30 extends radially outwardly from the airfoil 26 and protects the radially-outer end of the airfoil 26 from rub damage during use in an engine.

The abrasive tip 30, is adapted to engage a seal element arranged radially-outward of the turbine blade 10 during rotation of the turbine blade 10 in a gas turbine engine. Thus, the abrasive tip 30 protects the primary body 20 of the turbine blade 10 from rubbing the seal element such that ceramic matrix composite materials of the primary body 20 are kept intact.

The illustrative abrasive tip 30 is airfoil shaped and is arranged in the primary gas path GP as shown in the drawings. The abrasive tip 30 comprises chopped ceramic fibers. The chopped ceramic fibers are discontinuous from ceramic fabric suspended in ceramic matrix material that makes up the primary body. The chopped fibers may be Silicon-Carbide (SiC) fibers with diameters down to 10 micrometers (0.0004 inches). A melt infiltration layer 40 of ceramic matrix material couples the abrasive tip 30 to the primary body 20.

In some contemplated embodiments, the abrasive tip 30 may be made from a piece or pieces of monolithic ceramic. In other contemplated embodiments, the abrasive tip 30 may comprise a number of laminate layers of ceramic reinforcement fibers suspended in a ceramic matrix material. These laminate layers of ceramic reinforcement fibers suspended in a ceramic matrix material may be discontinuous from fibers of reinforcement included in the primary body 20. Indeed, the laminate layers of ceramic reinforcement fibers included in the abrasive tip 30 may have a lower density, or higher density, of reinforcement than the primary body. Further, the density and/or composition of the matrix material included in the abrasive tip 30 may be different from that of the primary body 20.

Figure 3:
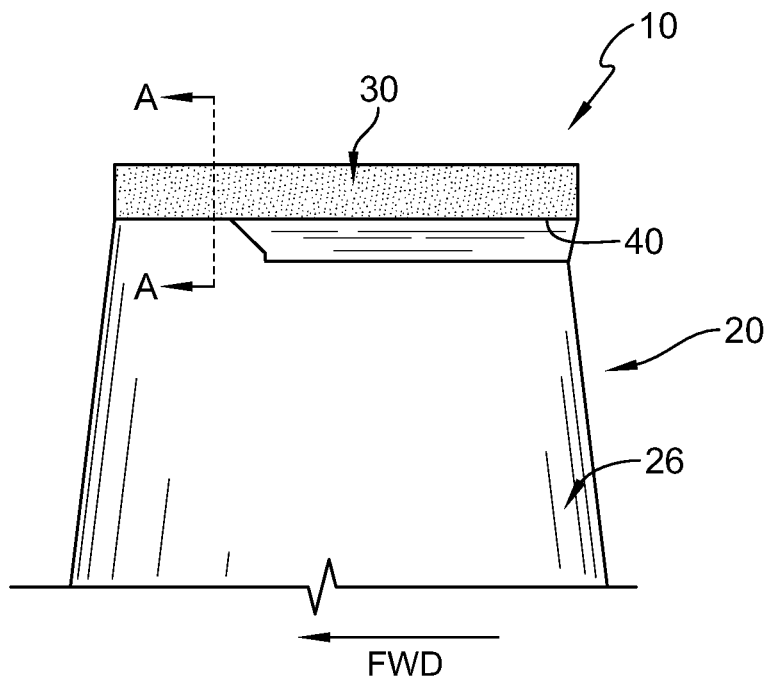
FIG. 3 is a side elevation view of the radially-outer end of the airfoil and the abrasive tip included in the turbine blade of FIG. 1 showing that the abrasive tip can be smoothly formed, such as would be the case when the abrasive tip is co-infiltrated with the primary body of the turbine blade or is built up via various methods.
Figure 4:
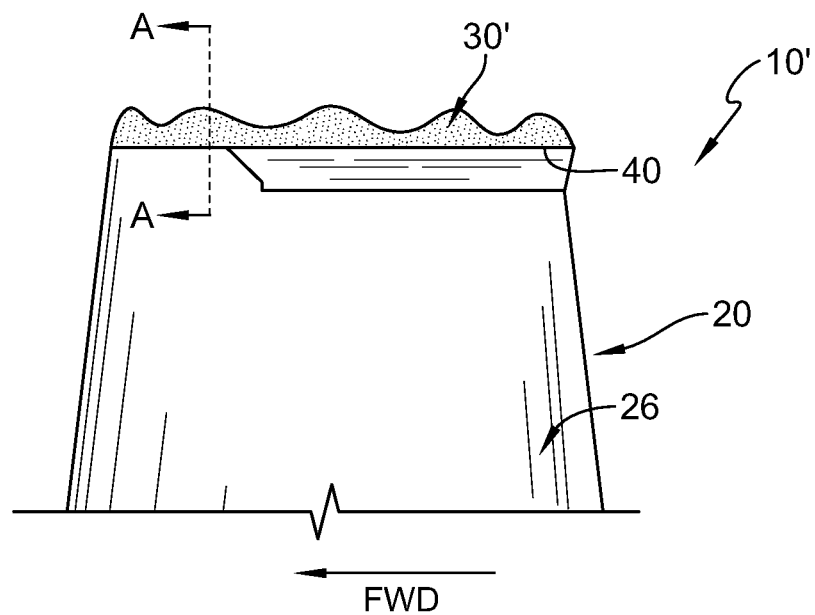
FIG. 4 is a side elevation view of the radially-outer end of the airfoil and the abrasive tip included in the turbine blade of FIG. 1 showing that the abrasive tip can be rough formed, such as would be the case when the abrasive tip is built up via slurry infiltration with particles included in the abrasive tip.

In an optional modification to the abrasive tip 30 shown in FIGS. 1-3, coarse abrasive particles may be suspended in the ceramic matrix material of a composite abrasive tip 30' to create a rough abrasive tip as suggested in FIG. 4. The rough abrasive tip 30' could reduce the amount of surface area being rubbed at any one instant. This can help to keep the rub temperatures lower when a turbine blade 10' including the abrasive tip 30' is used in a gas turbine engine. Such a rough abrasive tip may be slurry based. In some instances, such a rough abrasive tip may omit other reinforcing fibers.

The abrasive particles used in the illustrative abrasive tip 30' may be selected from at least one of silicon-carbide (SiC), carbon-boron (C-BN), and silicon-nitride (SiN). In other embodiments, other types of particle may be used. Each particle has an exemplary diameter of between about (or precisely) 0.002-0.0065 inches, average size (50-165 micrometers) to provide about 80 and 230 grit. In other embodiments, particles may have an exemplary diameter of between about (or precisely) 0.0004-0.0118 inches, average size (10-300 micrometers). However, other sizes of particle are contemplated.

Figure 5:
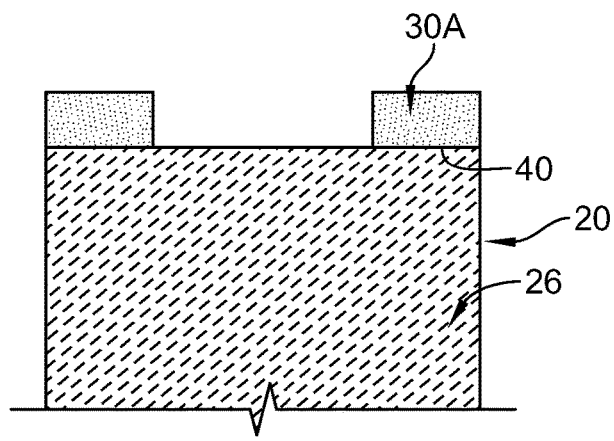
FIG. 5 is a cross sectional view of the radially-outer end of the airfoil and the abrasive tip included in the turbine blade of FIG. 3 or 4 taken at line A-A showing that the abrasive tip may be built up primarily around the perimeter of the airfoil so as to provide a squealer or winglet configuration.
Figure 6:
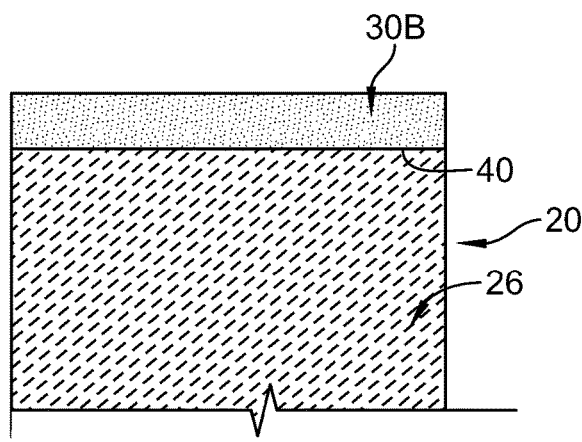
FIG. 6 is a cross sectional view of the radially-outer end of the airfoil and the abrasive tip included in the turbine blade of FIG. 3 or 4 taken at line A-A showing that the abrasive tip may be shaped to provide a flat top configuration.
Figure 7:
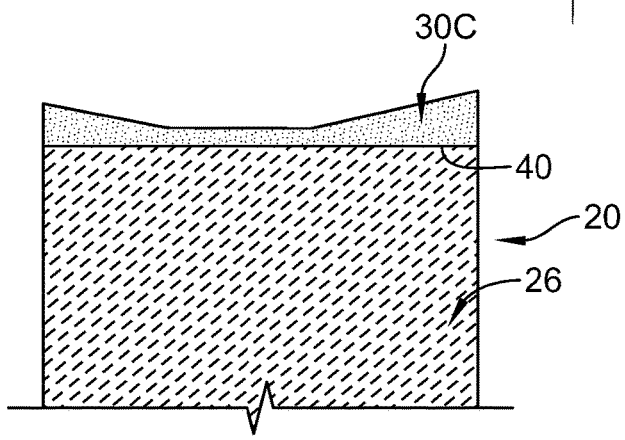
FIG. 7 is a cross sectional view of the radially-outer end of the airfoil and the abrasive tip included in the turbine blade of FIG. 3 or 4 taken at line A-A showing that the abrasive tip may be shaped to have varying thickness with the thickest portion built up around the perimeter of the airfoil to provide a squealer configuration.

In one contemplated shroudless turbine blade embodiment in accordance with the present disclosure, an abrasive tip 30A may be shaped to extend up primarily around the perimeter of the airfoil 26 so as to provide a squealer or winglet configuration as shown in FIG. 5. In another embodiment, an abrasive tip 30B may be shaped to provide a flat top configuration as shown in FIG. 6, which generally corresponds with the design of FIGS. 1-3. In yet another embodiment, abrasive tip 30C may be shaped to have varying thickness with the thickest portion built up around the perimeter of the airfoil 26 to provide a squealer or winglet configuration.

Returning to the primary body 20 of the turbine blade 10, it is noted that the primary body 20 is shaped to integrally form a root 22, a platform 24, and an airfoil 26 as shown in FIG. 1. Thermal barrier coating may be applied to some or all of the primary body 20 but may be omitted from the abrasive tip 30. In other contemplated embodiments, thermal barrier coating of different types or thicknesses may be applied to the abrasive tip 30. In still other embodiments, thermal barrier coatings may be applied to selected portions of the primary body 20 and/or to the abrasive tip 30.

The root 22 has a fir-tree shape but in other embodiments may have a dove-tail shaped, apertures for fastener coupling, or may have any other suitable shape with features for coupling directly or indirectly to a disk. The platform 24 extends circumferentially and axially from the airfoil 26 between the root 22 and the airfoil 26 to provide the radially-inner boundary of the primary gas path GP. In some embodiments, the platform is not integrated with the rest of the primary body 20. The airfoil 26 is shaped to interact with hot gasses discharged from a combustor in an associated gas turbine engine and to extract work therefrom.

The airfoil 26 is illustratively of solid construction enabled by the high temperature capability of the ceramic matrix composite materials. However, in other embodiments, the airfoil 26 may be actively cooled via internal channels supplied with cooling air.

Figures 8, 9:
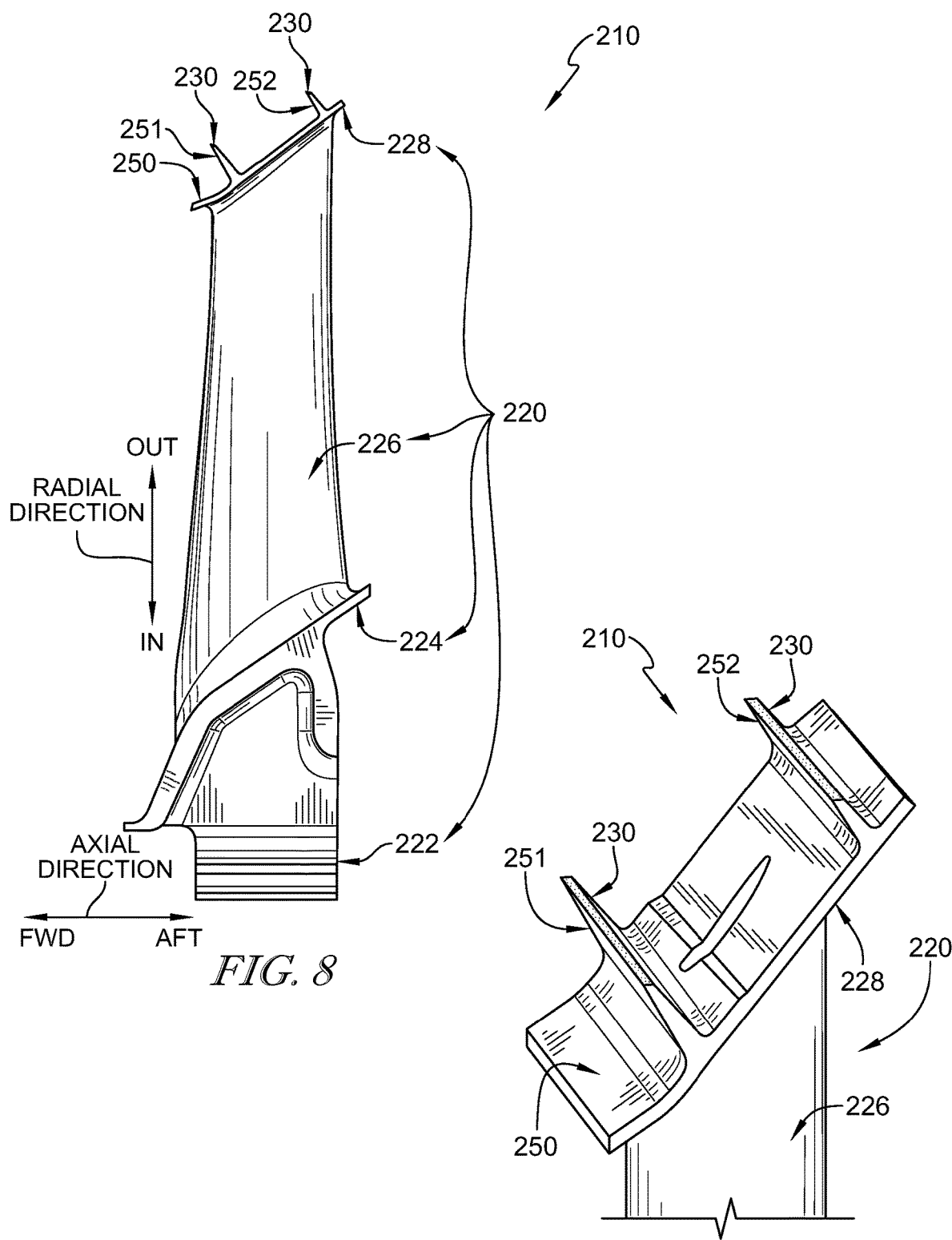
FIG. 8 is a side elevation view of a second turbine blade including, from bottom to top, a root, a platform, an airfoil, a blade shroud with knife seals, and abrasive tips configured to protect ceramic matrix composite materials included in the knife seals of the airfoil from rub damage that could be incurred during use in a gas turbine engine.
FIG. 9 is a perspective view of a radially-outer end of the airfoil, the blade shroud, and the abrasive tips included in the turbine blade of FIG. 8.
Figure 10:
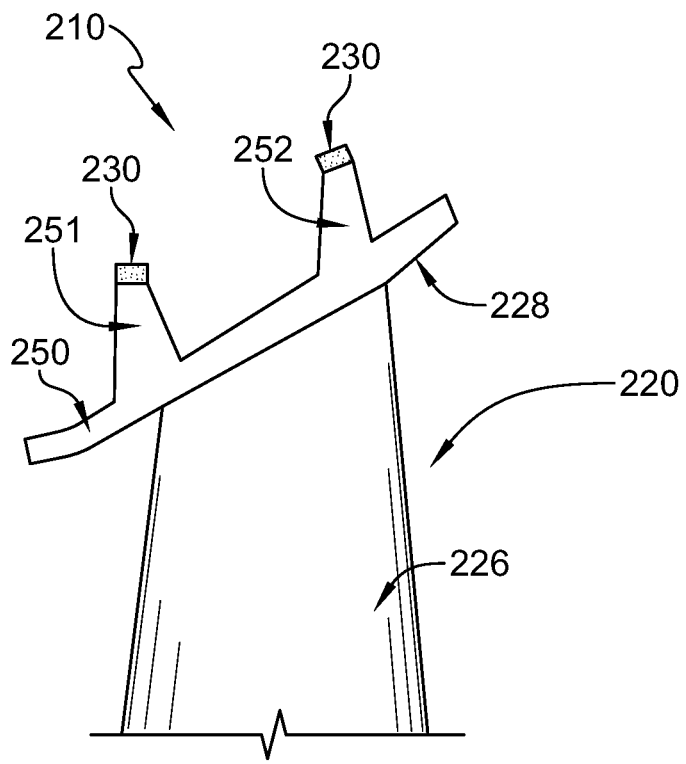
FIG. 10 is a side elevation view of the radially-outer end of the airfoil, the blade shroud with knife seals, and the abrasive tip included in the turbine blade of FIGS. 9 and 10.

Turning now to the embodiment of FIGS. 8-10, a turbine blade 210 according to the present disclosure includes a primary body 220 with a blade shroud 228 and abrasive tips 230. The primary body 220 and the abrasive tips 230 of the turbine blade 210 comprise ceramic matrix composite materials. The abrasive tips 230 are arranged to interface/engage with parts radially-outward of the primary body 220 that are likely to rub the turbine blade 210 during use.

The turbine blade 210 of the present disclosure is adapted for rotation about a central axis of a gas turbine engine so as to drive rotation of other components within the engine. The turbine blade 210 includes the primary body 220 and the abrasive tips 230 as shown in FIGS. 8-10. The primary body 220 is shaped to provide a root 222, a platform 224, an airfoil 226, and a blade shroud 228. The abrasive tip 230 extends radially outwardly from the blade shroud 228 and protects the radially-outer end of the blade shroud 228 from rub damage during use in an engine.

The abrasive tips 230 are adapted to engage a seal element arranged radially-outward of the turbine blade 210 during rotation of the turbine blade 210 in a gas turbine engine. Thus, the abrasive tips 230 protect the primary body 220 of the turbine blade 210 from rubbing the seal element such that ceramic matrix composite materials of the primary body 220 are kept intact.

The illustrated blade shroud 228 include a shroud panel 250 and knife seals 251, 252 as shown in FIGS. 8-10. The shroud panel 250 defines a radially-outer boundary of the primary gas path GP while the knife seals 251, 252 extend radially outward from the shroud panel 250.

The illustrative abrasive tips 230 are bonded to radially-outwardly facing surfaces of the knife seals 251, 252. The abrasive tips 230 illustratively comprise chopped ceramic fibers. The chopped ceramic fibers are discontinuous from ceramic fabric suspended in ceramic matrix material that makes up the primary body 220. A melt infiltration layer 240 of ceramic matrix material couples the abrasive tips 230 to the primary body 220.

In some contemplated embodiments, the abrasive tips 230 may be made from a piece or pieces of monolithic ceramic. In other contemplated embodiments, the abrasive tips 230 may comprise a number of laminate layers of ceramic reinforcement fibers suspended in a ceramic matrix material. These laminate layers of ceramic reinforcement fibers suspended in a ceramic matrix material may be discontinuous from fibers of reinforcement included in the primary body 220. Indeed, the laminate layers of ceramic reinforcement fibers included in the abrasive tips 230 may have a lower density, or higher density, of reinforcement than the primary body. Further, the density and/or composition of the matrix material included in the abrasive tips 230 may be different from that of the primary body 220.

In an optional modification to the abrasive tips 230, coarse abrasive particles may be suspended in the ceramic matrix material of the abrasive tips 230 to create a rough tip. Such a rough abrasive tip could reduce the amount of surface area being rubbed at any one instant. This can help to keep the rub temperatures lower when a turbine blade including the rough abrasive tip is used in a gas turbine engine. Such a rough abrasive tip may be slurry based. In some instances, such a rough abrasive tip may omit other reinforcing fibers.

The abrasive particles used in the illustrative abrasive tips 230 may be selected from at least one of silicon-carbide (SiC), carbon-boron (C-BN), and silicon-nitride (SiN). In other embodiments, other types of particle may be used.

Each particle has an exemplary diameter of between about (or precisely) 0.002-0.0065 inches, average size (50-165 micrometers) to provide about 80 and 230 grit. In other embodiments, particles may have an exemplary diameter of between about (or precisely) 0.0004-0.0118 inches, average size (10-300 micrometers). However, other sizes of particle are contemplated.

Thermal barrier coating may be applied to some or all of the primary body 220 but may be omitted from the abrasive tips 230. In other contemplated embodiments, thermal barrier coating of different types or thicknesses may be applied to the abrasive tips 230. In still other embodiments, thermal barrier coatings may be applied to selected portions of the primary body 220 and/or to the abrasive tips 230.

Figure 11:
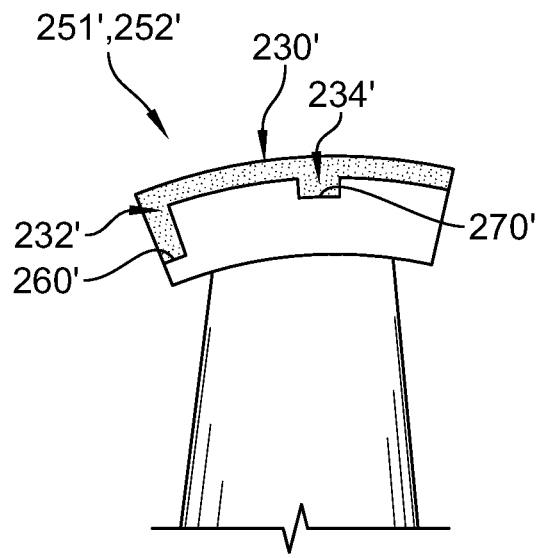
FIG. 11 is a front elevation view of an abrasive tip that may be optionally used within the second turbine blade of FIGS. 8-10 the optional abrasive tip shown has a retention feature designed to hold the abrasive tip in place during rotation of the turbine blade when used in a gas turbine engine.

In an optional modification from the turbine blade 210, a blade 210' can have knife seals 251', 252' with a leading edge recess 260' and a retainer channel 270' as shown in FIG. 11. The leading edge 260' recess opens to face circumferentially in the direction of expected blade 210' rotation and is spaced apart from the outer boundary of a primary gas path GP defined by the blade shroud 228'. The retainer channel 270' is radially outwardly opening.

The abrasive tip 230' has a forward portion 232' that extends into the leading edge recess 260' as shown in FIG. 11. The forward portion 232' is then bonded to a circumferentially-facing leading edge surface of the blade shroud 228' that defines the leading edge recess 260' to protect ceramic matrix composite materials of the blade shroud 228'. The forward portion 232' of the abrasive tip 230' establishes a radially-extending interfaces between the abrasive tip 230' and the blade shroud 228' that can help with retention of the abrasive tip 230' when the turbine blade 210' rotates.

The abrasive tip 230' also has a retention portion 234' that extends radially inward into the retainer channel 270' of the blade shroud 228' as shown in FIG. 11. The retainer portion 234' establishes a plurality of radially-extending interfaces between the abrasive tip 230' and the blade shroud 228' that can help with retention of the abrasive tip 230' when the turbine blade 210' rotates.

According to one method of making turbine blades in accordance with the present disclosure, several steps may be taken to couple an abrasive tip to the primary body of the blade. In a first step, ceramic fabric sheet(s) may be laid up into a laid-up primary body formed to include an airfoil etc. Then, the laid-up primary body may be partially densified (illustratively via slurry infiltration) to create a green primary body. An abrasive tip preform may then be arranged on a radially-outwardly facing surface of the green primary body. The combination of the green primary body and the preform abrasive tip with ceramic matrix material may be melt or slurry infiltrated with additional ceramic matrix material. Melt infiltration may create a of ceramic matrix material between a then-established primary body and abrasive tip thereby coupling the abrasive tip to the primary body.

It is contemplated that abrasive tips described in this disclosure could be modified to have a specific pattern favorable for cutting (like those described in FIGS. 3-7 or other suitable patterns). One method for creating specific patterns of abrasive tips is described in US Publication No. 2016/0214907 A1 for FORMING A SURFACE LAYER OF A CERAMIC MATRIX COMPOSITE ARTICLE, which is hereby incorporated by reference herein. Another method of creating specific patterns as shown and described may be direct laser deposition of materials onto radially-outwardly facing surfaces of ceramic matrix composite turbine blades to establish abrasive tips to protect the primary component materials.

The present disclosure describes designs and methods for creating an abrasive tip without putting structural ceramic matrix composite material of a turbine blade at risk of oxidation and recession. In some disclosed embodiments, an abrasive layer may be added to the tips of a ceramic matric composite (CMC) blade (shrouded or shroudless). This abrasive layer can be fiber reinforced or a monolithic. An example of fiber reinforced would include a chopped fiber tip or a separate laminated layer. The main purpose of this would be to allow the tip layer to do the rubbing function while preventing the rubbing from reaching the structural fibers in the blade.

The tip can also be a rough layer with an uneven profile. The rough layer could be applied on the blade tip after slurry infiltration. Melt infiltration could join the tip layer to the rest of the blade preform. The rough layer is possibly slurry based and can include chopped fiber and significantly coarse particles such as SiC, C-BN, and SiN to make it rough. The rough layer, as shown in FIG. 4, could reduce the amount of surface area being rubbed at any one instant. This could help to keep the rub temperatures lower.

A number of different embodiments for a shroudless blade are depicted in FIGS. 1-7. Exemplary embodiments include flat top configuration along with a squealer or winglet configuration.

In some embodiments, a simple constant thickness layer on top of the knife edge is shown. In other embodiments, a mechanical locking/retention features may be incorporated into abrasive tips. In one specific example, mechanical locking/retention features are shown put into the knife feature on the suction side slash face. This may help in retaining the tip layer on a knife edge surface. A similar feature is shown in the center of the knife to show that multiple interlocking features could be included.

It is further noted that the abrasive tip layers of the present disclosure may also be produced in other patterns some that may include mechanical retention features. For example, it is contemplated that a separate slurry layer with a waffle pattern retention features may be incorporated into abrasive tips like those described herein.

It is noted that radial directions described throughout this description relate to a central axis of an associated gas turbine engine. While the central axis is not shown, it is understood to extend left to right under the root of the airfoils shown in FIGS. 1 and 8. Moreover, arrows indicating radial and axial direction are annotated onto FIGS. 1 and 8 to support understanding of the present disclosure.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine blade adapted for rotation about a central axis in a gas turbine engine, the turbine blade comprising
   a primary body comprising ceramic matrix composite materials formed to include an airfoil shaped to interact with hot gasses in a gas turbine engine and to extract work therefrom and a blade shroud that extends circumferentially from the airfoil and radially outward from the airfoil to define an outer boundary of a primary gas path across the airfoil, and an abrasive tip bonded to a radially-outwardly facing surface of the blade shroud included in the primary body, the abrasive tip configured to protect ceramic matrix composite materials of the blade shroud from rub by structures mounted radially-outward of the turbine blade when the turbine blade is rotated during use in the gas turbine engine wherein the abrasive tip includes a forward portion bonded along a circumferentially-facing leading edge surface of the blade shroud to protect ceramic matrix composite materials of the blade shroud.

2. The turbine blade of claim 1, wherein the abrasive tip comprises chopped ceramic fibers suspended in a ceramic matrix material.

3. The turbine blade of claim 2, wherein the abrasive tip includes particles of at least one of silicon-carbide, carbon-boron, and silicon-nitride, and the particles have a diameter of between 10-300 micrometers.

4. The turbine blade of claim 1, wherein the blade shroud includes a shroud panel that provides the outer boundary of the primary gas path across the airfoil and at least one knife seal that extends radially outward from the shroud panel, and wherein the abrasive tip is bonded to a radially-outwardly facing surface of the at least one knife seal.

5. The turbine shroud of claim 1, wherein the blade shroud includes a leading edge recess spaced apart from the outer boundary of the primary gas path across the airfoil that receives the forward portion of the abrasive tip.

6. A turbine blade adapted for rotation about a central axis in a gas turbine engine, the turbine blade comprising a primary body comprising ceramic matrix composite materials formed to include an airfoil shaped to interact with hot gasses in a gas turbine engine and to extract work therefrom and a blade shroud that extends from the airfoil away from the central axis and circumferentially in both directions to define an outer boundary of a primary gas path across the airfoil, and an abrasive tip bonded to a radially-outwardly facing surface of the blade shroud included in the primary body, the abrasive tip configured to protect ceramic matrix composite materials of the blade shroud from rub by structures mounted radially-outward of the turbine blade when the turbine blade is rotated during use in the gas turbine engine, wherein the abrasive tip includes a retention portion that extends radially inward into the blade shroud to establish a plurality of radially-extending interfaces between the abrasive tip and the blade shroud along a leading edge and a circumferentially facing edge of the blade shroud.

* * * * *